July 19, 1949.  C. JOBST  2,476,550
INJECTOR FOR MOLDING MACHINES
Filed March 2, 1945

Inventor
CONRAD JOBST
By Rule and Hoge
Attorneys

Patented July 19, 1949

2,476,550

UNITED STATES PATENT OFFICE 2,476,550

INJECTOR FOR MOLDING MACHINES

Conrad Jobst, Toledo, Ohio, assignor, by mesne assignments, to Owens-Illinois Glass Company, Toledo, Ohio, a corporation of Ohio Application March 2, 1945, Serial No. 580,636

2 Claims. (Cl. 18—30)

My invention relates to molding machines of the type in which molding material is heated and introduced into the molds through an injector or nozzle. The invention is well adapted to be embodied in machines for molding thermoplastic materials which are supplied to the machine in powdered or granular form and are heated and brought to a molten or plastic condition while passing through the injector to the mold, into which the molten material is forced under high pressure.

In machines of this type, difficulty has been experienced on the account of portions of the molding material lodging in cracks, crevices, pockets or other recesses, in the walls of the injector channel or passageway through which the material is conducted to the mold. When such particles or small portions become lodged in the injector and held for an undue length of time within the heated passageway, they become overheated and discolored so that when dislodged and carried into the molds, they contaminate the molding material and cause discoloration and defects in the molded articles.

An object of the present invention is to provide an injector in which the channel for the molding material is fully streamlined in a manner to provide a smooth flow of the material and in which the channel is free from cracks, crevices, or joints in which portions of the material can become lodged. The invention provides a construction free from threaded connections or joints which would permit leakage of the molten molding material under the high pressure which is used, particularly as such joints tend to become loose when subjected to combined high temperatures and pressures and frequent variations in the temperatures and pressures throughout wide ranges.

A further object of the invention is to provide a novel injector providing an annular passageway through which the molding compound is conducted in a comparatively thin layer and with suitable heating means positioned both externally and internally of said passageway in a manner to cause thorough heat soaking or uniform heating of the entire mass of the material.

Other objects of the invention will appear hereinafter.

Referring to the accompanying drawings.

Figure 1:
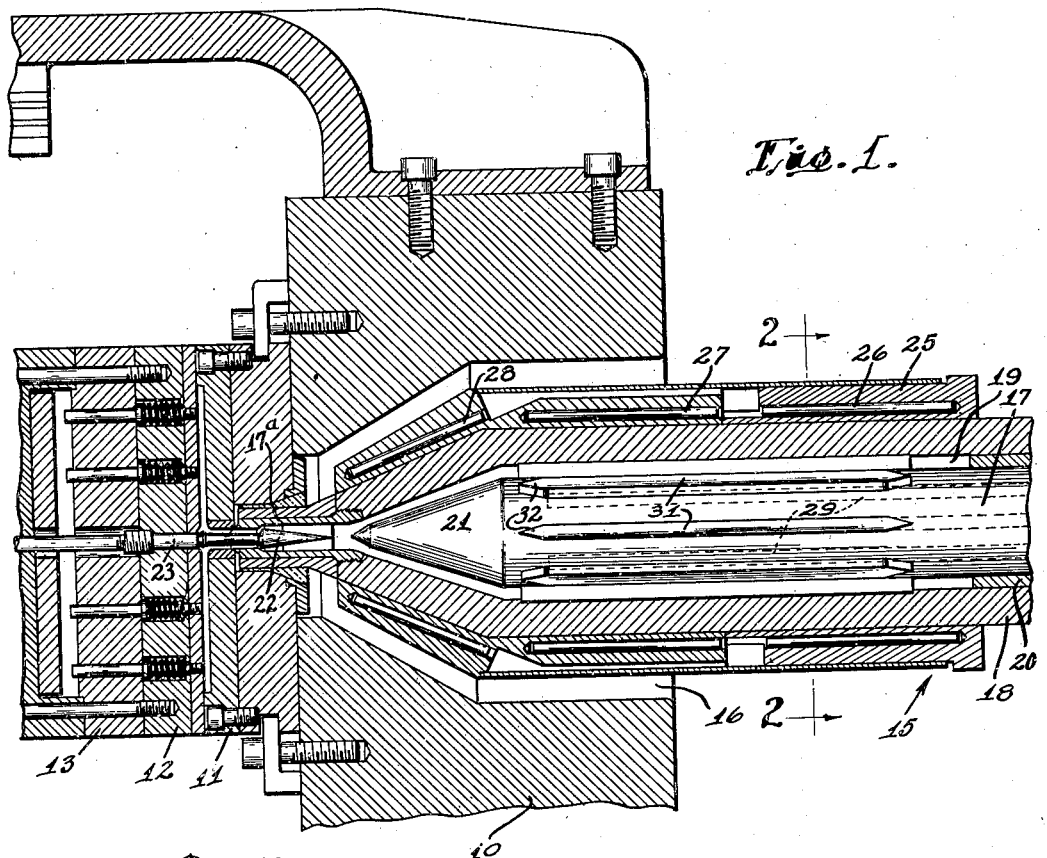
Fig. 1 is a fragmentary sectional elevation of an injection molding machine, showing the dies and the injector.

Referring to Fig. 1, the machine comprises a stationary frame including an abutment plate 10, a stationary die plate or mold section 11 and a movable die plate or mold section 12 mounted on a carriage 13. The carriage is reciprocated horizontally and moves the die plate 12 to and from the plate 11 for closing and opening the mold. The die plate 11 is attached to a face plate 14 bolted to the abutment plate 10.

An injector 15, herein referred to as an injection nozzle, extends forwardly through an opening 16 in the plate 10 and is provided at its forward end with a tip 17a extending through the face plate 14 and abutting the stationary die plate 11. The injection nozzle comprises a cylindrical core 17 surrounded by an exterior tubular member 18 or shell, spaced from the core to provide an annular passageway 19 through which the molding material is conducted. A tubular injection plunger 20 is periodically reciprocated within the passageway 19 for forcing charges of the molding compound into the mold.

The forward end portion 21 of the core 17 is tapered to a point. The forward portion of the shell 18 is also tapered so that the passageway 19 is forwardly convergent and merges into the cylindrical bore or passageway extending through the tip 17a. Said bore provides a valve chamber in which a valve 22 is mounted. The valve is held open while the die plates are together by a rod 23 which is attached to the movable die plate 12 and extends through the sprue hole in the die plate 11 and the tip 17a and into the forward end of the valve chamber.

Surrounding the shell 18 is a heater 25 in which are embedded groups of electrical heating elements 26, 27 and 28, each group being arranged in an annular series surrounding the shell 18. The core 17 also has mounted therein an annular series of electrical heating elements 29. The passageway 19 serves as a heating chamber in which the molding material is heated and reduced to a plastic or fluid condition. The arrangement of the heating elements, both internally and externally of the annular heating chamber, permits the material to be quickly and uniformly heated throughout the mass. The heat soaking of the material insures a uniform temperature and homogeneous condition of the material as it enters the mold.

Figure 2:
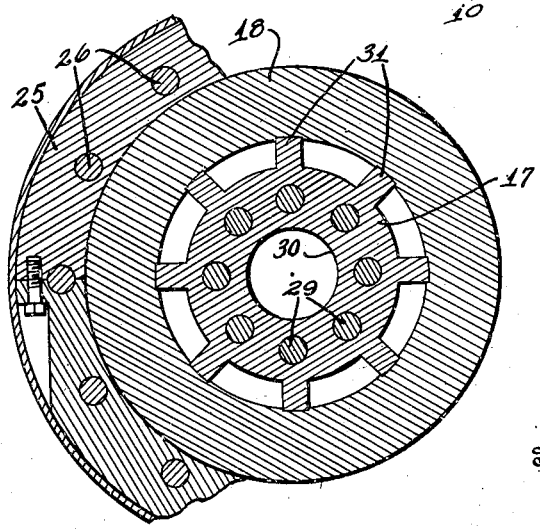
Fig. 2 is a cross section of the injector and heater at the line 2—2 on Fig. 1, with parts broken away.

The core 17 may be tubular or formed with a central bore 30 (Fig. 2). Spacing ribs 31 formed integral with the core 17 extend lengthwise thereof and each has its ends 32 tapered to a point. These ribs are arranged in parallel and spaced at equal intervals throughout the circumference of the core in an annular series. The outer faces of the ribs bear against the inner surface of the shell 18 and are embedded therein so that the core and shell form a unitary integrated structure free from cracks or crevices at their uniting surfaces. The ribs with their tapered ends provide streamlined passageways therebetween, free from any corners, cracks or crevices in which the molding material could become lodged.

The shell 18 and core 17 are preferably made of the same metal, such as steel, and the shell is shrunk onto the core by assembling the parts while the shell is at a high temperature and the core chilled to a low temperature. For this purpose the shell is heated to about an annealing temperature, approximately 550 degrees F., while the core 17 is chilled to about 90 degrees F. below zero. While the parts are at these temperatures, the core is dropped into the outer shell 18, or the shell dropped onto the core. This immediately causes a rapid heat transfer from the shell to the core so that the shell quickly cools and contracts while the core expands as its temperature rises, until the temperatures are equalized. This results in an extremely tight fit and interlocking of the parts to form practically an integral structure. This shrinking of the shell on the core causes the ribs to be embedded several thousandths of an inch within the inner surface of the shell. Owing to this method of assembling the parts, a perfectly tight fit is maintained under working conditions which involve high temperatures and frequent temperature changes throughout a rather wide range.

Modifications may be resorted to within the spirit and scope of my invention.

I claim:

1. An injector for injection molding machines comprising a cylindrical core and a cylindrical shell surrounding and concentric with the core, with an annular space between the shell and core, an annular series of ribs integral with the core and extending lengthwise thereof on the exterior surface of the core, each rib having its side parallel throughout a major portion of its length, said ribs being parallel and spaced at regular intervals around the core, the ribs being of a depth to bridge the said annular space and divide it into parallel channels, the outer faces of the ribs being embedded in the inner surface of the shell and the end portions of the ribs being tapered to points for streamlining the channels.

2. An injector for a molding machine, said injector comprising a cylindrical core having its forward end tapered to the form of a cone, a tubular shell comprising a body portion concentric with and surrounding the core, the interior surface of the said body portion being of greater diameter than the exterior surface of the core, to provide an annular space for the passage of molding material, the shell including a forward end portion integral with and forming an extension of said body portion, said end portion surrounding said cone and being tapered concentrically with said cone and forming therewith a convergent extension of said annular passageway, the wall thickness of the shell being substantially uniform throughout the length thereof, heating means surrounding the said body portion and tapered end portion of the shell, said core having integral ribs on its exterior surface extending lengthwise thereof and bridging the said annular space, said shell and core consisting of metal, the shell being shrunk onto the core with the ribs embedded in the interior surface of the shell.

CONRAD JOBST.

REFERENCES CITED

The following references are of record in the file of this patent:

UNITED STATES PATENTS

| Number | Name | Date |
|---|---|---|
| 1,854,517 | Layne | Apr. 19, 1932 |
| 2,016,878 | Vickers | Oct. 8, 1935 |
| 2,115,840 | Buhler | May 3, 1938 |
| 2,253,627 | Knowles | Aug. 26, 1941 |
| 2,319,439 | Burry | May 18, 1943 |
| 2,341,319 | Graham | Feb. 18, 1944 |
| 2,372,833 | Jobst | Apr. 3, 1945 |

FOREIGN PATENTS

| Number | Country | Date |
|---|---|---|
| 362,995 | France | July 18, 1906 |